Jan. 12, 1943.  D. H. BITNEY  2,307,914
PORTABLE OUTDOOR COOKING OR CAMP STOVE
Filed June 13, 1941   2 Sheets-Sheet 1
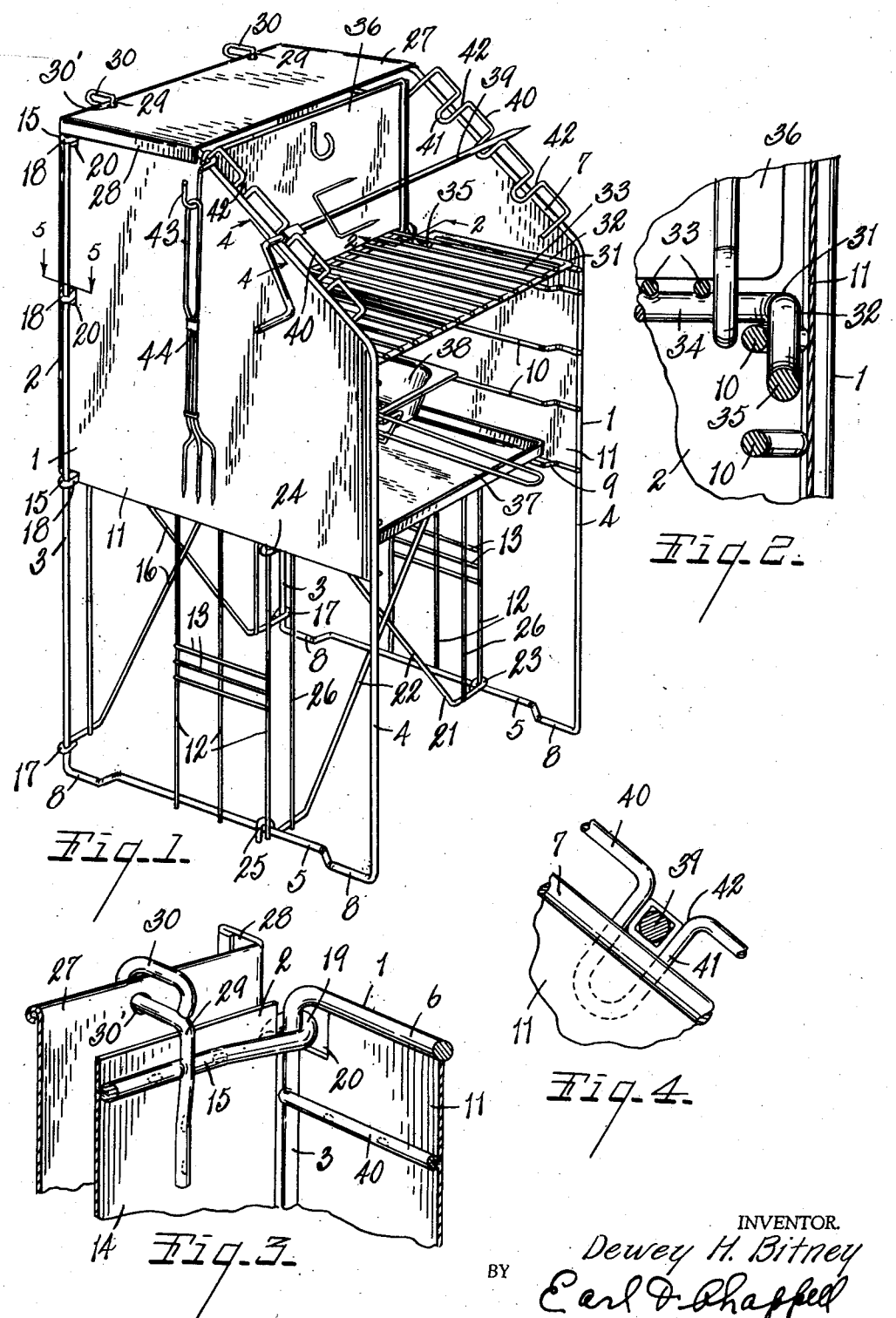
INVENTOR.
Dewey H. Bitney
BY Earl D. Chappell
ATTORNEYS.

Jan. 12, 1943. D. H. BITNEY 2,307,914
PORTABLE OUTDOOR COOKING OR CAMP STOVE
Filed June 13, 1941 2 Sheets-Sheet 2
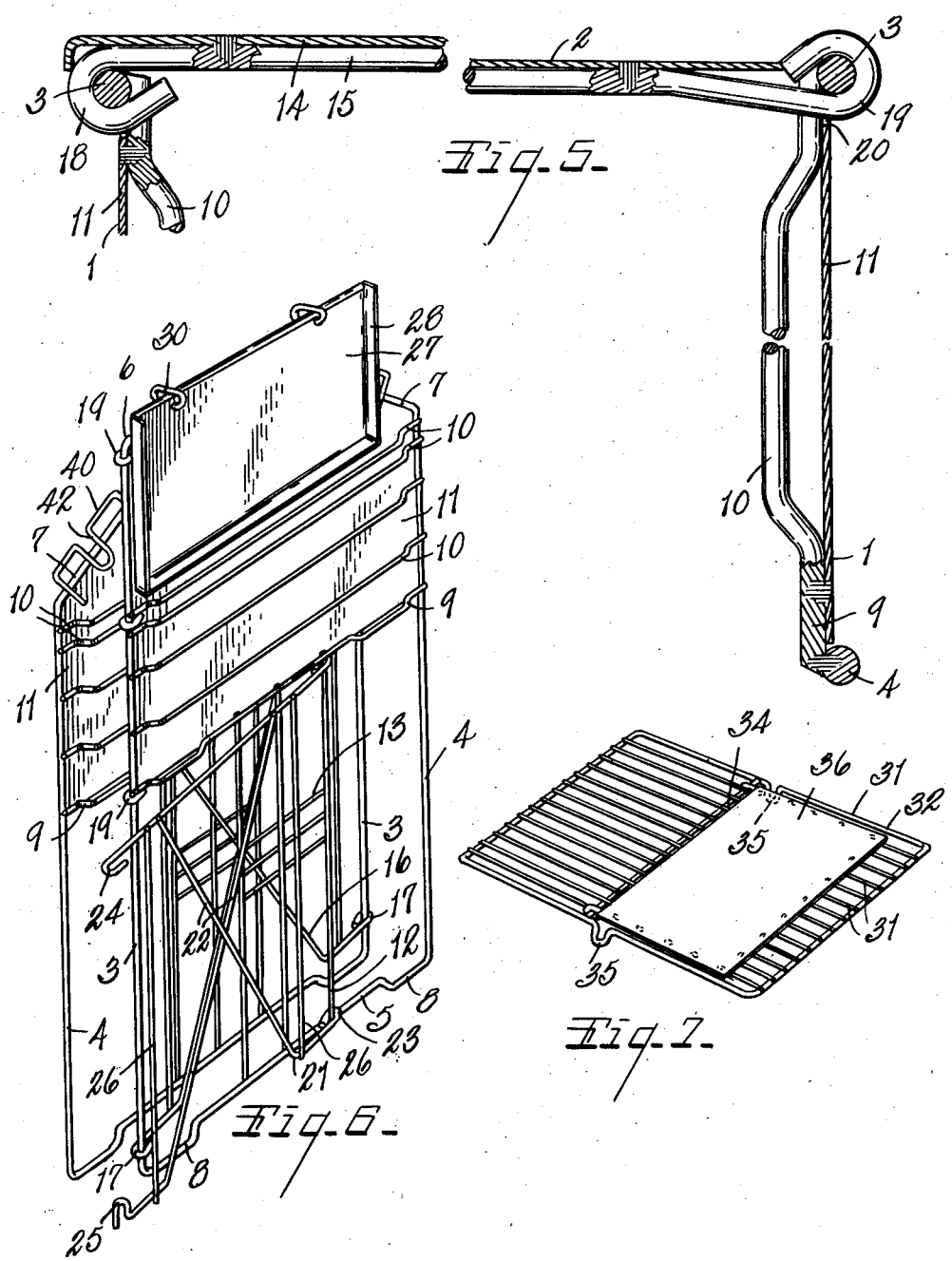
INVENTOR.
Dewey H. Bitney
BY Earl F. Chappell
ATTORNEYS.

Patented Jan. 12, 1943

2,307,914

UNITED STATES PATENT OFFICE 2,307,914

PORTABLE OUTDOOR COOKING OR CAMP STOVE

Dewey H. Bitney, Albion, Mich., assignor to Union Steel Products Company, Albion, Mich., a corporation of Michigan Application June 13, 1941, Serial No. 397,876

18 Claims. (Cl. 126—9)

This invention relates to improvements in portable outdoor cooking or camp stoves.

The main objects of this invention are:

First, to provide a portable outdoor cooking or camp stove which is adapted to be quickly set up or compactly collapsed for transportation or storage and one which when erected is desirably stable.

Second, to provide a stove of this type which is adapted for a wide variety of uses or for various uses to meet varying conditions in the preparation of food.

Third, to provide a structure of the type described which is light in weight, compact, and formed of heavy wire or light rod and sheet metal and at the same time one which when set up is very attractive in appearance.

Objects relating to details and economies of the invention will appear from the description to follow. The invention is defined and pointed out in the claims.

A preferred embodiment of the invention is illustrated in the accompanying drawings, in which:

Fig. 1 is a front perspective view of a structure embodying the features of my invention set up and with the fire pan and drip pan in position, the parts adjusted to provide a closed cooking chamber or compartment and with a spit in position.

Fig. 2 is an enlarged fragmentary section on line 2—2 of Fig. 1 showing details of the grid and the plate adjustably mounted thereon, the plate being adjusted to its cooking compartment door position.

Fig. 3 is an enlarged fragmentary perspective view partially in section showing the relation of the side and back members and the top, the top being in collapsed position.

Fig. 4 is an enlarged fragmentary view in section on line 4—4 illustrating details of the spit supporting means.

Fig. 5 is an enlarged fragmentary section on line 5—5 of Fig. 1 showing further structural details and the pivotal relation of the side and back members.

Fig. 6 is a perspective view of the collapsed structure, the grid, fire pan and drip pan not being included in this figure.

Fig. 7 is a perspective view of the combined grid and cooking plate and door member.

The embodiment of my invention illustrated comprises side members designated generally by the numerals 1, 1 and a back member designated generally by the numeral 2. These members are constructed and associated in a manner adapted for the purposes for which the structure is designed.

Each side member comprises a frame formed of heavy wire or light rod stock and including a rear upright 3, a front upright 4, a bottom member 5 connecting the uprights, and a top member 6 connecting the upper ends of the uprights. These parts are formed in one piece and buttwelded to form a continuous frame. The top member 6 has forwardly inclined front portions 7. The bottom member 5 has an upwardly offset central portion providing feet 8 for the side members which adds to its stability and its use on the ground or a somewhat uneven surface as is commonly met with for outdoor use.

The side members are provided with a plurality of vertically spaced rails 9 which are welded at its ends on the inner sides of the uprights and these serve as slats or supporting ledges for parts to be described.

Each side member is provided with a grid supporting bar 10 disposed in spaced relation above the top rail 9. The wall panels 11 are welded or otherwise secured to the frame and these rails and bars are welded or otherwise secured to the outer ends of these frames and bars. These wall panels extend only part way of the length of the frames.

Vertical reinforcing bars 12 extend from the bottom rail to the bottom cross member 5, see Figs. 1 and 6, and tie members 13 are provided for these bars 12. This provides a very rigid construction for the end members even when formed of comparatively light stock.

The back 2 comprises the back panel 14 having cross pieces 15 welded thereto, the bottom cross piece having crossed struts 16 welded thereto and terminating at their lower ends in eyes 17 pivotally receiving the rear uprights 3. The cross pieces 15 terminate in eyes 18 and 19 which pivotally receive the uprights 3 of the pair of side members, see Fig. 5. It will be noted that the eyes at one end of the cross pieces 15 have forward turns while those at the other end have rearward turns, the purpose of this being to permit the collapsing of the side members, one on the inside of the back member and the other on the outside thereof, as shown in Fig. 6. The side wall panels 11 are recessed or notched at 20 to receive these eyes.

To brace and support these parts in erected position, I provide a brace member designated generally by the numeral 21 which comprises the crossed brace bars 22 which terminate at one end in eyes 23 pivoted on the front upright bar 12 of one side member. The other ends of these cross bars terminate in hooks 24 and 25, the bottom hook 24 engaging over the bottom frame member 5 while the upper hook 25 engages with the front upright bar 12 of the other side member, see Fig. 1. These hooks are detachably engaged and when they are engaged, the members are prevented from collapsing and are also braced. The tie bars or rods 26 connect corresponding ends of the brace members 22.

The structure is further braced in erected position by means of the sheet metal top 27 which has downturned flanges 28 at the ends thereof which flanges engage over the top member 6. This top member 27 is loosely hinged on the hinge members 29 which extend upwardly from the top cross bar 15 of the rear member and is provided with elongated eyes 30 engaging the holes 30' in the top member so that the top member can be swung to depending collapsed position, as shown in Figs. 3 and 6, or forwardly to erected position, as shown in Fig. 1, in which position it serves as an effective cross member for the erected structure.

I provide a grid member designated generally by the numeral 31 and comprising a border frame 32 of wire or light rod with slats 33 welded to the ends thereof, there being an intermediate cross member 34. The side members of this grid are provided with downwardly projecting lugs 35 which are engageable with the grid supporting bars 10, as shown in Figs. 1 and 2, the grid when in position serving as a reinforcing member and as a tie member for the erected structure. This grid is slidable on the rails 10 for convenience in placing or removing articles of food placed thereon for cooking.

A combined door and cooking plate 36 is hinged to the intermediate cross piece 34 of the grid and this is adapted to be collapsed upon the front portion of the grid, as shown in Fig. 7, or swung to erected position, as shown in Fig. 1, in which position it coacts with the wall panels and the top in providing a closed cooking compartment or oven. In its forward collapsed position, it serves as a cooking plate or the grid may be adjusted so that the cooking plate is at the rear.

The drip pan 37 may be selectively positioned on the rails 9 either to serve as a drip pan for broiling operations, for example, or as an ash receptacle below the fire pan 38 which is also slidably or selectively engageable with the rails or ledge members.

I preferably provide means for supporting the spit 39 on the forwardly inclined portions of the top member 7 of the top frame member 6, these being in the form of wire or light rod 40 having spaced downwardly disposed loops 41 therein welded to the inner sides of the top portions 7 and providing, with these portions 7, a series of holders 42 with which the spit may be selectively engaged. The fire pan, as stated, may be variously adjusted relative to the grid, either for delivering heat to the front portion thereof as for broiling or barbecuing, or relative to the closed cooking portion or compartment. At 43, I provide a supporting hook for a fork 44 or other utensil or implement.

With the parts thus arranged, I provide a structure which may be formed of a relatively light material and at the same time when erected is strong and rigid. The structure may be quickly and compactly collapsed either for shipment or transportation or storage. When collapsed for shipment, the grid, drip pan and fire pan are arranged alongside of the collapsed unit which is shown in its collapsed position in Fig. 6.

My improved outdoor stove or camp stove is adapted for a very wide range of uses and is very efficient for the purpose desired. Also, it has the advantage of being convenient to use as the cooking grid and oven and parts associated therewith are substantially elevated.

I have illustrated and described my invention in a commercial embodiment thereof which I have found highly practical and satisfactory. I have not attempted to illustrate or describe other embodiments or adaptations as it is believed that this disclosure will enable those skilled in the art to embody or adapt my improvements as may be desired.

Having thus described my invention, what I claim as new and desire to secure by Letters Patent, is:

1. In a portable outdoor stove, the combination of side members each comprising a frame formed of rod stock and including front and rear uprights and connecting top and bottom members therefor, the top member having a forwardly inclined front portion, vertically spaced supporting rails welded to the inner sides of the uprights in opposed pairs, grid supporting bars disposed above said rails and welded to said uprights, side wall panels disposed on the outer sides of said rails and grid supporting bars, a rear member comprising a wall panel and cross bars welded to the inner sides thereof and terminating in eyes pivotally receiving the rear uprights of said side members, said side member panels being recessed to receive said cross bars, and downwardly extending cross strut members welded to the bottom cross bar and terminating in eyes engaging said side member rear uprights, a top having downturned flanges at its ends hingedly connected to the top of said rear member to be adjusted to erected position with its flange engaging the top members of the side frames or to be collapsed at the rear of said rear member, said side members being collapsible one on each side of said rear member, a brace member comprising crossed members terminating in eyes at one end pivoted on one of said side members intermediate the uprights thereof and with hooks at the other end detachably engageable with the other side member and collapsible when disengaged therefrom against the side member to which it is pivoted, and a grid detachably engageable with said grid supporting bars and having depending portions engaging said bars whereby said grid constitutes a bracing and cross tie member, said grid having a plate intermediately pivoted thereto whereby the plate may be adjusted to a vertical position to constitute the front wall of a cooking compartment or swung to horizontal position to rest upon the grid to constitute a cooking plate.

2. In a portable outdoor stove, the combination of side members each comprising a frame formed of rod stock and including front and rear uprights and connecting top and bottom members therefor, the top member having a forwardly inclined front portion, vertically spaced supporting rails welded to the inner sides of the uprights in opposed pairs, grid supporting bars disposed above said rails and welded to said uprights, side wall panels disposed on the outer sides of said rails and grid supporting bars, a rear member comprising a wall panel and cross bars welded to the iner sides thereof and terminating in eyes pivotally receiving the rear uprights of said side members, said side member panels being recessed to receive said cross bars, a top hingedly connected to the top of said rear member to be adjusted to erected position or to be collapsed at the rear of said rear member, said side members being collapsible one on each side of said rear member, and a grid detachably engageable with said grid supporting bars and having depending portions engaging said bars whereby said grid constitutes a bracing and cross tie member, said grid having a plate intermediately pivoted thereto whereby the plate may be adjusted to a vertical position to constitute the front wall of a cooking compartment or swung to horizontal position to rest upon the grid to constitute a cooking plate.

3. In a portable outdoor stove, the combination of side members each comprising a frame formed of rod stock and including front and rear uprights and connecting top and bottom members therefor, the top member having a forwardly inclined front portion, vertically spaced supporting rails welded to the inner sides of the uprights in opposed pairs, grid supporting bars disposed above said rails and welded to said uprights, side wall panels disposed on the outer sides of said rails and grid supporting bars, a rear member comprising a wall panel and cross bars welded to the inner sides thereof and terminating in eyes pivotally receiving the rear uprights of said side members, said side member panels being recessed to receive said cross bars, downwardly extending cross strut members welded to the bottom cross bar and terminating in eyes engaging said side member rear uprights, a top having downturned flanges at its ends hingedly connected to the top of said rear member to be adjusted to erected position with its flange engaging the top members of the side frames or to be collapsed at the rear of said rear member, said side members being collapsible one on each side of said rear member, and a brace member comprising crossed members terminating in eyes at one end pivoted on one of said side members intermediate the uprights thereof and with hooks at the other end detachably engageable with the other side member and collapsible when disengaged therefrom against the side member to which it is pivoted.

4. In a portable outdoor stove, the combination of side members each comprising a frame formed of rod stock and including front and rear uprights and connecting top and bottom members therefor, the top member having a forwardly inclined front portion, vertically spaced supporting rails welded to the inner sides of the uprights in opposed pairs, grid supporting bars disposed above said rails and welded to said uprights, side wall panels disposed on the outer sides of said rails and grid supporting bars, a rear member comprising a wall panel and cross bars welded to the inner sides thereof and terminating in eyes pivotally receiving the rear uprights of said side members, said side member panels being recessed to receive said cross bars, and a top hingedly connected to the top of said rear member to be adjusted to erected position or to be collapsed at the rear of said rear member, said side members being collapsible one on each side of said rear member.

5. In a portable outdoor stove, the combination of collapsibly connected side and rear members provided with wall panels at the upper ends thereof, collapsible means for maintaining said members in erected position, supporting rails disposed on said side members interiorly of their wall panels, a grid removably engageable with said side members and constituting a transverse tie member when in engaged position therewith, said grid being provided with a plate-like member pivotally connected thereto to be swung to erected position constituting the front of a cooking compartment or collapsed to constitute a cooking plate, and a top member adjustably connected to said rear member to be collapsed at the side thereof or to be positioned upon the side members.

6. In a portable outdoor stove, the combination of collapsibly connected side and rear members provided with wall panels at the upper ends thereof, collapsible means for maintaining said members in erected position, supporting rails disposed on said side members interiorly of their wall panels, a grid removably engageable with said side members, said grid being provided with a plate-like member pivotally connected thereto to be swung to erected position constituting the front of a cooking compartment or collapsed to constitute a cooking plate, and a top member adjustably connected to said rear member to be collapsed at the side thereof or to be positioned upon the side members.

7. In a portable outdoor stove, the combination of collapsibly connected side and rear members provided with wall panels at the upper ends thereof, collapsible means for maintaining said members in erected position, supporting rails disposed on said side members interiorly of their wall panels, a grid removably engageable with said side members and constituting a transverse tie member when in engaged position therewith, and a top member adjustably connected to said rear member to be collapsed at the side thereof or to be positioned upon the side members.

8. In a portable outdoor stove, the combination of collapsibly connected side and rear members provided with wall panels at the upper ends thereof, collapsible means for maintaining said members in erected position parallel to one another, fire pan supporting rails disposed on said side frames interiorly of their wall panels, said side members being provided with forwardly inclined means for selectively supporting a spit in desired vertical relation to a fire pan supported upon said rails.

9. In a portable outdoor stove, the combination of side and rear members pivotally articulated for collapsing the side members one on each side of the rear member, said side and rear members including wall panels, strut means for maintaining said side members in parallel spaced relation in erected position pivotally mounted on one of said side members and detachably engageable with the other and collapsible upon the side member on which it is pivotally mounted, a plurality of vertically spaced supporting rails mounted on said side members at the inner side of their wall panels, a grid detachably engageable with one of said pairs of side rails and when so engaged constituting a transverse tie member, and a top hinged to said rear member to be collapsed at the rear thereof or to be swung to erected position and in supported engagement with said side members and constituting when in erected position a transverse tie member therefor.

10. In a portable outdoor stove, the combination of side and rear members pivotally articulated for collapsing the side members one on each side of the rear member, said side and rear members including wall panels, a plurality of pairs of vertically spaced supporting rails mounted on said side members at the inner side of their wall panels, a grid detachably engageable with one of said pairs of side rails and when so engaged constituting a transverse tie member, said grid having a plate hingedly connected thereto intermediate the ends of the grid to be swung to collapsed position upon the grid or to erected position constituting the front of a cooking compartment, and a top hinged to said rear member to be collapsed at the rear thereof or to be swung to erected position and in supported engagement with said side members and constituting when in erected position a transverse tie member therefor.

11. In a portable outdoor stove, the combination of side and rear members pivotally articulated for collapsing the side members one on each side of the rear member, said side and rear members including wall panels, a plurality of pairs of vertically spaced supporting rails mounted on said side members at the inner side of their wall panels, a grid detachably engageable with one of said pairs of side rails and when so engaged constituting a transverse tie member, and a top hinged to said rear member to be collapsed at the rear thereof or to be swung to erected position and in supported engagement with said side members and constituting when in erected position a transverse tie member therefor.

12. In a portable outdoor stove, the combination of side and rear members pivotally articulated for collapsing the side members one on each side of the rear member, said side and rear members including wall panels, strut means for maintaining said side members in parallel spaced relation in erected position pivotally mounted on one of said side members and detachably engageable with the other and collapsible upon the side member on which it is pivotally mounted, a grid having a plate hingedly connected thereto intermediate the ends of the grid to be swung to collapsed position upon the grid or to erected position constituting the front of a cooking compartment, and a top hinged to said rear member to be collapsed at the rear thereof or to be swung to erected position.

13. In a structure of the class described, the combination of walled side and rear members articulated for collapsing into side by side relation or to be erected with the side members in parallel relation, means for maintaining said side members in erected position, a top adjustably mounted on one of said members to be collapsed at the side thereof or to be swung to erected position, and a removable grid having a plate adjustably mounted thereon and adapted to be adjusted to erected position to coact with the walls and top in providing an enclosed space, and fire and drop pan supporting rails on said side members.

14. In a structure of the class described, the combination of walled side and rear members, a grid, a top above the rear portion of said grid, said grid having a plate-like member adjustably mounted thereon and adapted to be adjusted to erected position to coact with the walls and top in providing an enclosed space, and fire and drip pan supporting rails on said side members.

15. In a structure of the class described, the combination of side and rear members provided with wall panels, a top, and a grid having a plate adjustably mounted thereon to be adjusted to erected position to coact with the said wall panels and top in providing an enclosed cooking space or to be collapsed upon the grid.

16. In a portable outdoor stove, the combination of swingably connected side members erectable from a collapsed position to operative position parallel to one another, fire pan supporting rails secured to said members erectable to operative position therewith, said side members being provided with downwardly and forwardly inclined portions having wire rod elements secured therealong in successive downwardly and forwardly spaced loops defining a plurality of vertically spaced spit holders above said rails adapted to selectively support a spit in desired vertical relation to a fire pan supported upon said rails.

17. In a portable outdoor stove, the combination of swingably connected side members erectable from a collapsed position to operative position relative to one another, fire pan supporting means on said members erectable to operative position therewith, said side members being provided with downwardly and forwardly inclined portions having wire rod elements secured therealong in successive downwardly and forwardly spaced loops defining a plurality of vertically spaced spit holders above said means adapted to selectively support a spit in desired vertical relation to a fire pan supported on said means.

18. In a portable outdoor stove, the combination of swingably connected side members erectable from a collapsed position to operative position relative to one another, fire pan supporting means on said members erectable to operative position therewith, said side members being provided with portions defining a plurality of vertically spaced spit holders above said means adapted to selectively support a spit in desired vertical relation to a fire pan supported on said means.

DEWEY H. BITNEY.